United States Patent
Chugh et al.

(10) Patent No.: US 12,541,878 B2
(45) Date of Patent: Feb. 3, 2026

(54) METHODS AND SYSTEMS FOR GAZE TRACKING AND GAZE TRACKING CALIBRATION

(71) Applicant: Huawei Technologies Co., Ltd., Shenzhen (CN)

(72) Inventors: Soumil Chugh, Toronto (CA); Juntao Ye, Markham (CA); Moshe Eizenman, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 222 days.

(21) Appl. No.: 18/524,640

(22) Filed: Nov. 30, 2023

(65) Prior Publication Data

US 2025/0182328 A1    Jun. 5, 2025

(51) Int. Cl.
*G06T 7/80* (2017.01)
*G06T 7/246* (2017.01)
*G06T 7/73* (2017.01)

(52) U.S. Cl.
CPC ............ *G06T 7/80* (2017.01); *G06T 7/246* (2017.01); *G06T 7/73* (2017.01); *G06T 2207/30201* (2013.01)

(58) Field of Classification Search
CPC .. G06T 7/80; G06T 7/246; G06T 7/73; G06T 2207/30201
See application file for complete search history.

(56) References Cited

U.S. PATENT DOCUMENTS 9,244,529 B2    1/2016   Model
9,311,527 B1 *  4/2016   Yin .......................... G06F 3/00
(Continued)

FOREIGN PATENT DOCUMENTS

CN    109008944 A    12/2018
CN    116434314 A    7/2023
WO    2023011339 A1  2/2023

OTHER PUBLICATIONS

Chugh, Soumil, et al. "Detection and correspondence matching of corneal reflections for eye tracking using deep learning." 2020 25th International Conference on Pattern Recognition (ICPR). IEEE, 2021.

(Continued)

*Primary Examiner* — Phuoc Tran
(74) *Attorney, Agent, or Firm* — Slater Matsil, LLP (57) ABSTRACT

The present disclosure allows for accurate and computationally efficient gaze tracking without requiring a corneal reflection. Eye tracking systems and methods are provided. They include obtaining images of the user's face, detecting a head pose, and locating the centre eye rotation, the pupil centre, the optical axis, the cornea centre and finally the visual axis corresponding to the gaze direction using user-specific parameters. Calibration systems and methods are also provided for acquiring the user-specific parameters. They include at least twice displaying a target point for the user to glaze at, directing light to obtain a corneal reflection, obtaining an image of the user's face, detecting the head pose, inferring a transformation to convert coordinates between the world coordinate system and a head coordinate system, and locating the corneal reflection, the cornea centre, the pupil centres and the optical axes. The data acquired thereby is used to compute the parameters.

20 Claims, 4 Drawing Sheets

(56) References Cited

U.S. PATENT DOCUMENTS

| | | | | |
|---|---|---|---|---|
| 11,487,360 B1* | 11/2022 | Lan | ..................... | G06V 40/166 |
| 11,710,350 B2 | 7/2023 | Sengelaub et al. | | |
| 2017/0119298 A1* | 5/2017 | Cheung | ............... | G06V 40/193 |
| 2020/0326777 A1 | 10/2020 | Shoushtari et al. | | |

OTHER PUBLICATIONS

Pathirana, Primesh, et al. "Eye gaze estimation: A survey on deep learning-based approaches." Expert Systems with Applications 199 (2022): 116894.

Zhu, Zhiwei, and Qiang Ji. "Novel eye gaze tracking techniques under natural head movement." IEEE Transactions on biomedical engineering 54.12 (2007): 2246-2260.

Guestrin, Elias Daniel, and Moshe Eizenman. "General theory of remote gaze estimation using the pupil center and corneal reflections," IEEE Transactions on biomedical engineering 53.6 (2006): 1124-1133.

Cornsweet, Tom N., and Hewitt D. Crane. "Accurate two-dimensional eye tracker using first and fourth Purkinje images." Optical society of America 63.8 (1973): 921-928.

* cited by examiner

METHODS AND SYSTEMS FOR GAZE TRACKING AND GAZE TRACKING CALIBRATION

TECHNICAL FIELD

The technical field relates to eye tracking, and more specifically to systems and methods for tracking the gaze of a user and for calibrating a gaze tracker.

BACKGROUND

Camera-based eye tracking, also named gaze tracking, is one of the most popular ways of doing gaze estimation. It can be implemented using different methods.

Feature-based methods make use of a single eye feature, such as the vector between one corneal reflection and pupil centre, as described for instance in ZHU, Zhiwei et J I, Qiang; Novel eye gaze tracking techniques under natural head movement; IEEE Transactions on biomedical engineering, 2007, vol. 54, no 12, p. 2246-2260, the entire disclosure of which is incorporated herein by reference. Such methods can only estimate bidimensional gaze, i.e., a directly estimated bidimensional gaze point on a monitor. Therefore, they cannot be used in systems without monitors. Systems that give tridimensional results are preferred, since they can also be used for tracking a person's gaze direction in systems with or without monitors.

Appearance-based methods compute gaze position by leveraging machine learning techniques on images captured by the eye tracker's camera. They do not require corneal reflections, but have poor accuracy. The best performing appearance-based methods achieve accuracy of 2 to 3 degrees, as discussed for instance in PATHIRANA, Primesh, SENARATH, Shashimal, MEEDENIYA, Dulani, et al.; Eye gaze estimation: A survey on deep learning-based approaches; Expert Systems with Applications, 2022, vol. 199, p. 116894, the entire disclosure of which is incorporated herein by reference. Better accuracy can be achieved by retraining the model for every subject, although this is computationally very expensive and may not be practical. Appearance-based methods already require large training datasets that result in significant redesign efforts when the hardware of the eye tracker changes.

Geometrical eye model-based methods, as described for instance in GUESTRIN, Elias Daniel et EIZENMAN, Moshe; General theory of remote gaze estimation using the pupil centre and corneal reflections; IEEE Transactions on biomedical engineering, 2006, vol. 53, no 6, p. 1124-1133, the entire disclosure of which is incorporated herein by reference, can achieve better accuracy than the other categories of gaze methods. Due to the high accuracy and robustness to nominal head movements, variants of this method are seen in use in professional systems, such as the ones disclosed in U.S. Pat. Nos. 9,244,529, 11,442,537 and 11,710,350, the entire disclosures of which are incorporated herein by reference.

Geometrical eye model-based methods aim to reconstruct the tridimensional model of the eye in a physical space. A primary requirement of the existing systems is the presence of one or more corneal reflections in the eye. Corneal reflections are virtual images of the reflections of the LEDs on the cornea of the eye, as discussed for instance in CHUGH, Soumil, BROUSSEAU, Braiden, ROSE, Jonathan, et al.; Detection and correspondence matching of corneal reflections for eye tracking using deep learning; In: 2020 25th International Conference on Pattern Recognition (ICPR). IEEE, 2021; p. 2210-2217, the entire disclosure of which is incorporated herein by reference. Information about which light-emitting diode (LED) generated which corneal reflection must also be known. Corneal reflection detection and matching is a complex problem to solve due to varying environmental illumination especially in outdoor environments which affects the intensity of the reflections, the disappearance and reappearance of corneal reflections with changing head position, the lack of flexibility in changing the spatial positions of the LEDs, and the increased complexity of the hardware circuitry especially when synching LEDs with the camera shutter. This mostly limits existing tridimensional model-based approaches to use in controlled indoor environments.

SUMMARY

There exists a need for new camera-based eye tracking methods capable of achieving the accuracy of state-of-the-art geometrical eye model-based methods without the complexity and noise sensitivity associated with the use of corneal reflections. The present disclosure allows for accurate and computationally efficient gaze tracking without requiring a light source being placed at a known position to produce a corneal reflection. This result can be achieved by determining the coordinates of the pupil centre and the corresponding optical axis by finding the eye centre of rotation rather than the cornea centre. The gaze estimation pipeline broadly includes two major parts: calibration and gaze tracking. The calibration process involves estimating user-specific parameters that enhance the performance of the eye tracker. The calibration process disclosed herein, which is usually performed in a controlled setting, still makes use of corneal reflections.

In accordance with an aspect, a method for tracking a gaze of a user. This method does not require producing a corneal reflection. As with typical geometrical eye model-based eye tracking methods, the method includes obtaining, by an imaging sensor and at least one image of the user's face and obtaining a head pose estimation corresponding to the at least one image. The method then includes computing a centre of the user's eye rotation in a world coordinate system. This computation relies on the head pose and is made possible by the a parameter d corresponding to coordinates of the centre of the user's eye in the head coordinate system. This allows the method to continue by computing coordinates of the centre of the user's pupil in the world coordinate system from the centre of the user's eye in the world coordinate system, thanks to a parameter $k_d$ corresponding to the distance between a centre of a user's eye and a centre of a user's pupil, computing an optical axis in the world coordinate system from the centre of the user's eye and the centre of the user's pupil in the world coordinate system, and the parameter $k_d$, computing the centre of the user's cornea in the world coordinate system from the centre of the user's pupil in the world coordinate, the optical axis and a parameter K corresponding to the distance between a centre of the user's cornea centre and a centre of the user's pupil, and finally computing a visual axis from the centre of the user's cornea and the optical axis in the world coordinate system, and from a parameter $<\alpha, \beta>$ corresponding to an angle between an optical axis and a visual axis. The visual axis corresponds to the gaze direction.

In accordance with another aspect, a method for calibrating a gaze tracker for a user is provided. This method is used to compute the parameters required for tracking the gaze without using corneal reflections. It includes performing at least two calibration point cycles, assembling data collected by performing the calibration point cycles to obtain a set of coordinates of pupil centres, in a head coordinate system, and a set of optical axes in the head coordinate system, and computing, from the set of coordinates of the pupil centre and the set of optical axes in the head coordinate system a parameter $k_d$ corresponding to the distance between a centre of the user's eye and the pupil centre, and a parameter d corresponding to the coordinates of the centre of the user's eye in the head coordinate system. Performing each calibration point cycle includes displaying a calibration point on a monitor for the user to gaze at, directing, by at least one light source, at least one beam of light towards the user's eye to obtain a corneal reflection, obtaining, by an imaging sensor, at least one image of the user's face, obtaining a head pose estimation corresponding to the at least one image, detecting the corneal reflection from a region of the image comprising the user's eye, computing the coordinates of the cornea centre in the world coordinate system using the coordinates of the corneal reflection, the light source and the imaging sensor in the world coordinate system, computing the coordinates of the pupil centre in the world coordinate system using the coordinates of the corneal reflection, obtaining an optical axis in the world coordinate system, wherein the optical axis in the world coordinate system corresponds to the axis intersecting the cornea centre and the pupil centre, inferring, from the head pose, a transformation that, when applied to coordinates in the world coordinate system, yields corresponding coordinates in the head coordinate system, applying the transformation to the coordinates of the pupil centre in the world coordinate system to obtain corresponding coordinates of the pupil centre in the head coordinate system, and applying the transformation to the optical axis in the world coordinate system to obtain a corresponding optical axis in the head coordinate system.

In accordance with a further aspect, a gaze tracking system is provided. Advantageously, the system does not require a light source because it does not rely on corneal reflections. The system includes an imaging sensor for obtaining at least one image of a user's face, at least one memory storing a set of parameters associated with the user, and a gaze estimation module. The gaze estimation module is configured to detect a head pose corresponding to the image based, compute a centre of the user's eye rotation in a world coordinate system from the head pose thanks to a parameter d corresponding to the coordinates of the centre of the user's eye in the head coordinate system, compute coordinates of the centre of the user's pupil in the world coordinate from the centre of the user's eye in the world coordinate system thanks to a parameter $k_d$ corresponding to the distance between a centre of the user's eye and the pupil centre, compute an optical axis in the world coordinate system from the centre of the user's eye and the centre of the user's pupil in the world coordinate, and the first parameter $k_d$, compute the centre of the user's cornea in the world coordinate system from the centre of the user's pupil and the optical axis in the world coordinate and a parameter K corresponding to the distance between the cornea centre and the pupil centre, and compute a visual axis from the centre of the user's cornea and the optical axis in the world coordinate system, and from a parameter $<\alpha, \beta>$ corresponding to an angle between the optical axis and a visual axis. The visual axis corresponds to the gaze direction.

In some embodiments, the system also includes a calibration module, and can therefore be used to compute the parameters required for tracking the gaze without using corneal reflections. In these embodiments, the system does include at least one light source. It also includes a monitor. The calibration module is configured to perform at least two calibration point cycles, assemble data collected by performing the calibration point cycles to obtain a set of coordinates of pupil centres, in a head coordinate system, and a set of optical axes in the head coordinate system, and compute, from the set of coordinates of the pupil centre and the set of optical axes in the head coordinate system the parameter $k_d$ and the parameter d. Performing each calibration point cycle includes: displaying a calibration point on a monitor for the user to glaze at, directing, by at least one light source, at least one beam of light towards the user's eye to obtain a corneal reflection, obtaining, by the imaging sensor, at least one calibration image of the user's face, detecting a calibration head pose from the at least one calibration image, detecting the corneal reflection from a region of the calibration image comprising the user's eye, computing the calibration coordinates of the cornea centre in the world coordinate system using the coordinates of the corneal reflection, the light source and the imaging sensor in the world coordinate system, computing the calibration coordinates of the pupil centre in the world coordinate system using the calibration coordinates of the corneal reflection, obtaining a calibration optical axis in the world coordinate system, wherein the calibration optical axis in the world coordinate system corresponds to the axis intersecting the calibration cornea centre and the calibration pupil centre, inferring, from the calibration head pose, a calibration transformation that, when applied to calibration coordinates in the world coordinate system, yields corresponding calibration coordinates in the head coordinate system, applying the calibration transformation to the calibration coordinates of the pupil centre in the world coordinate system to obtain corresponding calibration coordinates of the pupil centre in the head coordinate system, and applying the calibration transformation to the calibration optical axis in the world coordinate system to obtain a corresponding calibration optical axis in the head coordinate system.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment.

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practised without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

In the present specification, "at least one" means one or more, and "a plurality of" means two or more. The expression "and/or" describes an association relationship of associated objects, and indicates that there may be three relationships. For example, "A and/or B" includes "only A", "both A and B", and "only B", where A and B may be singular or plural. The character "/" generally indicates that the associated objects are in an OR relationship. "At least one of the following items" or a similar expression thereof refers to any combination of these items, including any combination of a single item or a plurality of items. For example, all three of "at least one of a, b, or c", "at least one of a, b, and c" and "at least one of a, b, and/or c" may represent "a", "b", "c", "a and b", "a and c", "b and c", or "a, b and c", where a, b, and c may be a single or multiple form.

Geometrical tridimensional model-based eye tracking methods aim at finding the visual axis which represents the gaze direction. The visual axis is the vector that passes through the cornea centre connecting the fovea region of the retina and the object being gazed at. A prerequisite to estimating the visual axis is finding the optical axis, which is the line connecting the pupil centre and the cornea centre. In existing methods, the tridimensional coordinates of the cornea centre are computed using the location of one or more corneal reflections in the image and their corresponding LED position in the physical space. A one-time calibration process is performed to find the subject-dependent parameters where users are asked to look at calibration points on a monitor. GUESTRIN, Elias Daniel et EIZENMAN, Moshe, op. cit., presents a mathematical model for eye tracking.

The cornea centre is an important location in the context of eye modelling, since it is used to find the visual axis, also named "line of sight". The primary limitation of existing geometrical model-based approaches is the requirement of one or more corneal reflections in the image to estimate the tridimensional coordinates of the cornea centre at all times. As explained above, corneal reflections are not guaranteed to be present in the eye at all times especially during gaze tracking, due to various factors. Even if corneal reflections are present, it can be challenging to accurately track and match corneal reflections with their corresponding LEDs. This results in a highly noise-sensitive eye tracking system with a limited operating range.

Figure 1:
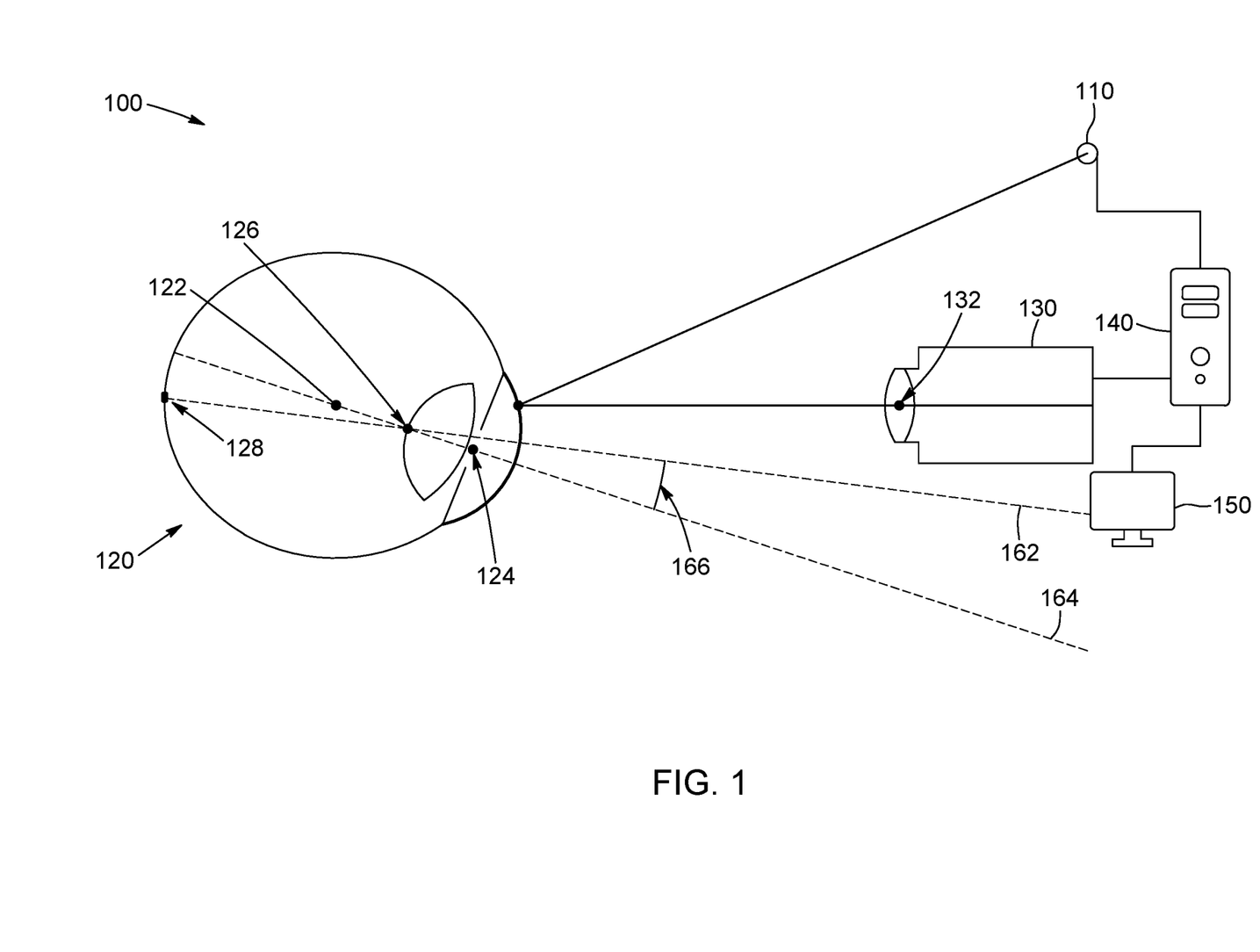
FIG. 1 is a schematic of a system for calibrating a gaze tracker, in accordance with an embodiment.

With reference to FIG. 1, a system 100 for calibrating a gaze tracker for a user is shown according to an example embodiment. Broadly described, the system 100 includes a light source 110 directing a light beam into an eye 120 of the user, a camera 130 capturing an image of the user's face, and a calibration 140 module for computing a number of calibration parameters associated with the user. While the calibration system relies on corneal reflections, the calibration parameters it computes can thereafter be used in an eye tracking system that does not require a light source being placed at a known position to produce a corneal reflection The location of elements of the system 100 can be indicated using the system 100 as a frame of reference, for instance in a world coordinate system (WCS), e.g., along three axes X, Y and Z. In particular, the calibration process requires knowing the coordinates of the light source 110 and of the nodal point 132 of the camera 130.

It can be appreciated that, while certain elements of the system 100 do not normally move while the system is being used and will therefore have the same WCS coordinates throughout a gaze tracking session, the user may move, and thus features of the user's eye may have different WCS coordinates even though the user is gazing in the same direction.

Advantageously, the location of elements of the user's eye 120 can further be indicated using the user's head as a frame of reference, creating a head coordinate system (HCS), e.g., along three axes X', Y' and Z', such that at least the centre 122 of the user's eye 120 have the same HCS coordinates throughout the gaze tracking session.

It can be appreciated that, when the position and the orientation of the user's head in the system 100 is known, it is possible to infer a transformation, e.g., a geometric transformation, such as a Euclidian transformation including a translation and/or a rotation, and/or a scaling transformation, making it possible to map WCS coordinates to HCS coordinates and inversely.

During a calibration session, the calibration module 140 performs a calibration point cycle by causing a calibration point to appear on a monitor 150. The user is instructed to gaze at the point while the light source 110 directs a beam towards their eye 120 and while the camera 130 captures an image of the user's face. This process is repeated a predetermined number of times, e.g., 2 times, 5 times or 9 times, or a randomly generated number of times, with the calibration point being displayed at different locations on the monitor 150. This process allows the calibration module 140 to compute the user-specific calibration parameters required for gaze tracking.

The calibration parameters include a parameter $k_d$, which corresponds to the distance between the centre of the user's eye 122, also called the rotation centre, and the centre of the user's pupil 124.

The calibration parameters include a parameter d corresponding to the coordinates of the centre of the user's eye 122, also named the centre of eye rotation, in the head coordinate system.

The centre of eye rotation 122 $d$ is on the line defined by the optical axis 164 ω of the eye 120 at a distance $k_d$ from the pupil centre 124 $p$, corresponding to:

$$d = p + k_d * \omega$$

In some embodiments, the calibration parameters include a parameter K corresponding to the distance between the cornea centre 126 and the pupil centre 124.

The axis linking the cornea centre 126 and the pupil centre 124, which can be measured, is called the optic axis 162, or the pupillary axis. It can equivalently be expressed as a unit vector w. The axis linking the fovea 128 and the cornea centre 126, which cannot be measured directly under normal conditions, is called the visual axis 164, or the line of sight. During the calibration process, the visual axis 164 can be inferred because it also links the cornea centre 126 and the calibration point.

In some embodiments, the calibration parameters include a parameter <α, β> corresponding to an angle 166 between the optical axis 162 and the visual axis 164, with α conventionally referring to the horizontal angle and B to the vertical angle between the optical axis 162 and the visual axis 164.

Figure 5:
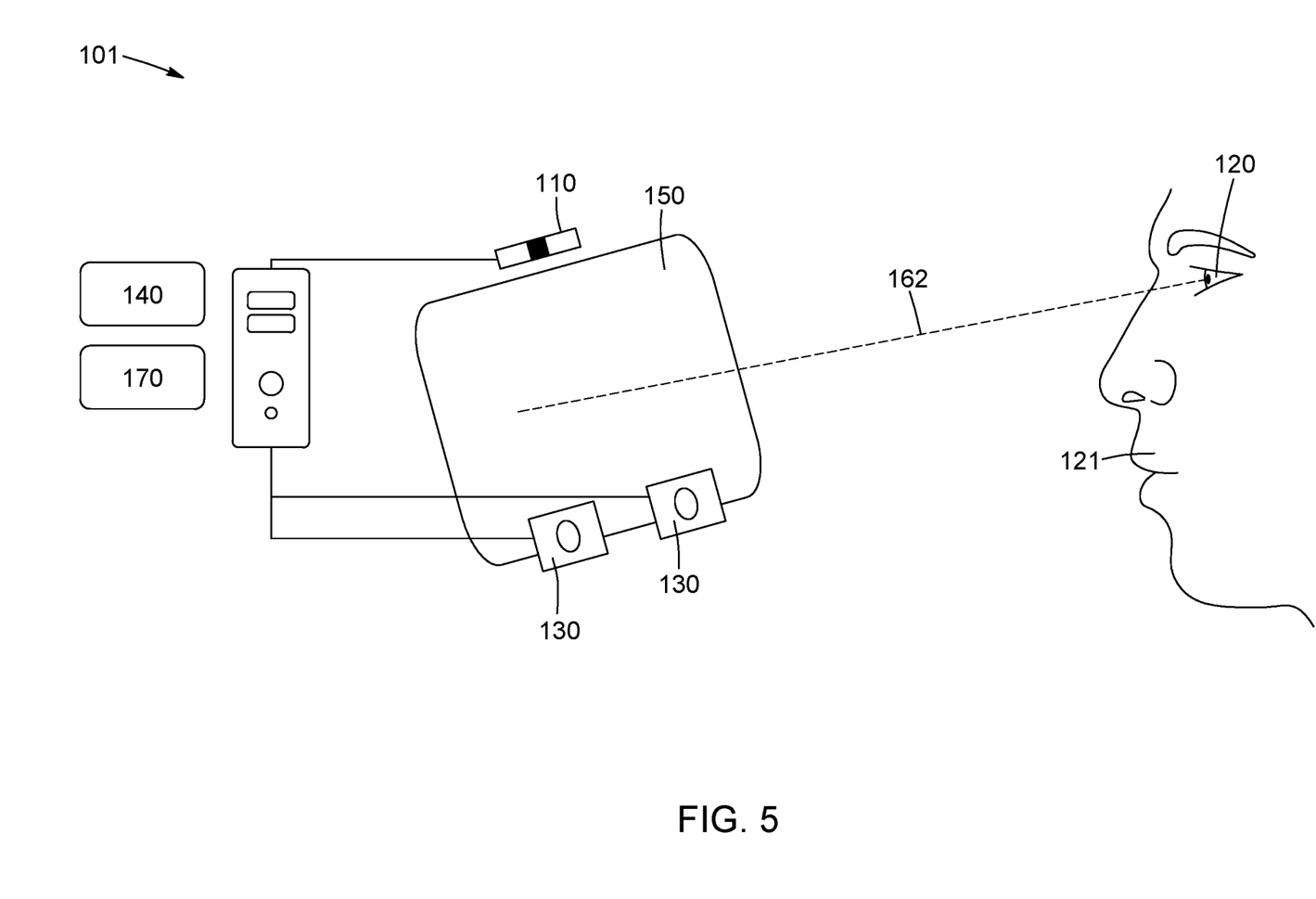
FIG. 5 is a schematic of a system for calibrating a gaze tracker, in accordance with an embodiment.

With reference to FIG. 5, a system 101 for tracking the gaze of a user and/or for calibrating a gaze tracker for a user is shown according to an example embodiment. Broadly described, the system 101 includes a light source 110 directing a light beam into an eye 120 of the user, an imaging sensor including two cameras 130 capturing images of the user's face, a calibration 140 module for computing a number of calibration parameters associated with the user and a gaze tracking module 170 for tracking the gaze of the user.

Various alternative embodiments of system 101 are possible. In one example embodiment, system 101 can be configured for both gaze tracking and calibration and include an infrared LED 110 and an infrared camera 130. In another example embodiment, system 101 can be configured for both gaze tracking and calibration and include an infrared LED 110 and both an infrared and a colour camera 130. In a further example embodiment, system 101 can be configured for gaze tracking only, include no LED and include a colour camera 130. It can be appreciated that other alternative embodiments of system 101 are possible.

System 101 can include a light source 110 suitable for directing a light beam towards the user's eye 120, which can for instance include one or more light-emitting diodes (LED), including for instance one or more colour, i.e., visible, LEDs and/or one or more infrared LEDs. In some alternative embodiments, other light sources can be additionally or alternatively be used, including for instance the monitor, an ambient lighting device such as a lightbulb in a lamp and/or a ceiling light fixture, and/or a natural light source such as sunlight, e.g., shining through a window.

System 101 includes an imaging sensor 130 suitable for acquiring images of the user's eye 120 or face 121. The imaging sensor can include one or more cameras, including for instance colour, e.g., RGB, cameras and/or infrared cameras. In some embodiments, system 101 includes a light source 110 including an infrared LED and an imaging sensor 130 including an infrared camera. Infrared light sources and cameras can be advantageous, because infrared does not interfere with human vision, allowing eye features to be tracked accurately, and system 101 can operate in varying environments including night time. In some embodiments, system 101 additionally or alternatively includes a light source including a colour light source and an imaging sensor including a colour camera. Using visible light can be advantageous in outdoor environments, because infrared light cast by the sun can interfere with operation of system 101.

System 101 can include a monitor 150. In some embodiments, the monitor can be provided with one or more attached or integrated light sources 110 and/or an attached or integrated imaging sensor 130. This makes it possible to perform calibration using monitor 150 and thereafter to track the gaze of the user using an application of a computer displaying information on a monitor 150.

System 101 can include a calibration module 140 that uses the one or more light sources 110, the imaging sensor 130 and the monitor 150 to acquire the user-specific parameters required for gaze tracking, for instance by performing method 200 as described below.

System 101 can include a gaze tracking module 170 that uses the imaging sensor 120 to track the gaze of the user, for instance using method 400 as described below.

One or more modules described herein may be implemented in computer program(s) executed on processing device(s), each including at least one processor, a data storage system (including volatile and/or non-volatile memory and/or storage elements), and optionally at least one input and/or output device. "Processing devices" encompass computers, servers and/or specialized electronic devices which receive, process and/or transmit data. As an example, "processing devices" can include processing means, such as microcontrollers, microprocessors, and/or CPUs, or be implemented on FPGAs. For example, and without limitation, a processing device may be a programmable logic unit, a mainframe computer, a server, a personal computer, a cloud-based program or system, a laptop, a personal data assistant, a cellular telephone, a smartphone, a wearable device, a tablet, a video game console or a portable video game device.

Each program is preferably implemented in a high-level programming and/or scripting language, for instance an imperative e.g., procedural or object-oriented, or a declarative e.g., functional or logic, language, to communicate with a computer system. However, a program can be implemented in assembly or machine language if desired. In any case, the language may be a compiled or an interpreted language. Each such computer program is preferably stored on a storage media or a device readable by a general or special purpose programmable computer for configuring and operating the computer when the storage media or device is read by the computer to perform the procedures described herein. In some embodiments, the system may be embedded within an operating system running on the programmable computer.

Furthermore, the system, processes and methods of the described embodiments are capable of being distributed in a computer program product including a computer readable medium that bears computer-usable instructions for one or more processors. The computer-usable instructions may also be in various forms including compiled and non-compiled code.

The processor(s) are used in combination with storage medium, also referred to as "memory" or "storage means". Storage medium can store instructions, algorithms, rules and/or trading data to be processed. Storage medium encompasses volatile or non-volatile/persistent memory, such as registers, cache, RAM, flash memory, ROM, diskettes, compact disks, tapes, chips, as examples only. The type of memory is, of course, chosen according to the desired use, whether it should retain instructions, or temporarily store, retain or update data.

Steps of the proposed method are implemented as software instructions and algorithms, stored in computer memory and executed by processors.

Figure 2:
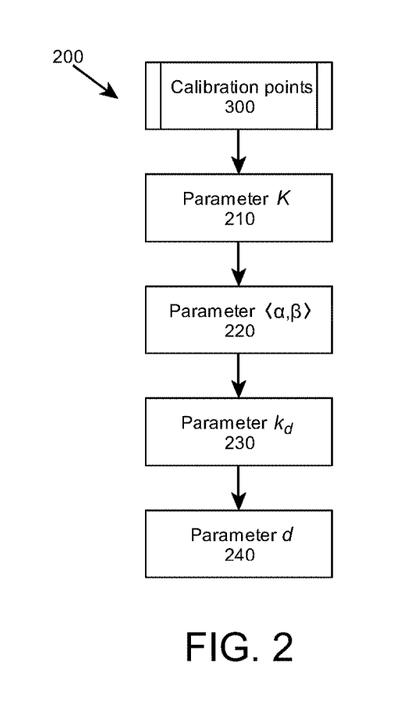
FIG. 2 is a flowchart of a method for calibrating a gaze tracker, in accordance with an embodiment.

With reference to FIG. 2, a method 200 for calibrating a gaze tracker for a user is shown according to an example embodiment. Broadly described, method 200 includes displaying calibration points over a predetermined number of calibration point cycles and making a number of calculations in submethod 300, then calculating user-specific parameters such as the four parameters K, <α, β>, $k_d$ and d described above in steps 210 to 240. It can be appreciated that steps 210 to 240 need not or, in some embodiment and for some steps, cannot be performed sequentially and/or in the order shown in FIG. 2.

While method 200 describes a calibration method to obtain parameters related to one eye of the user, it can be appreciated that the method can equivalently be used to obtain parameters related to more than one eye of the user at a time or sequentially.

Figure 3:
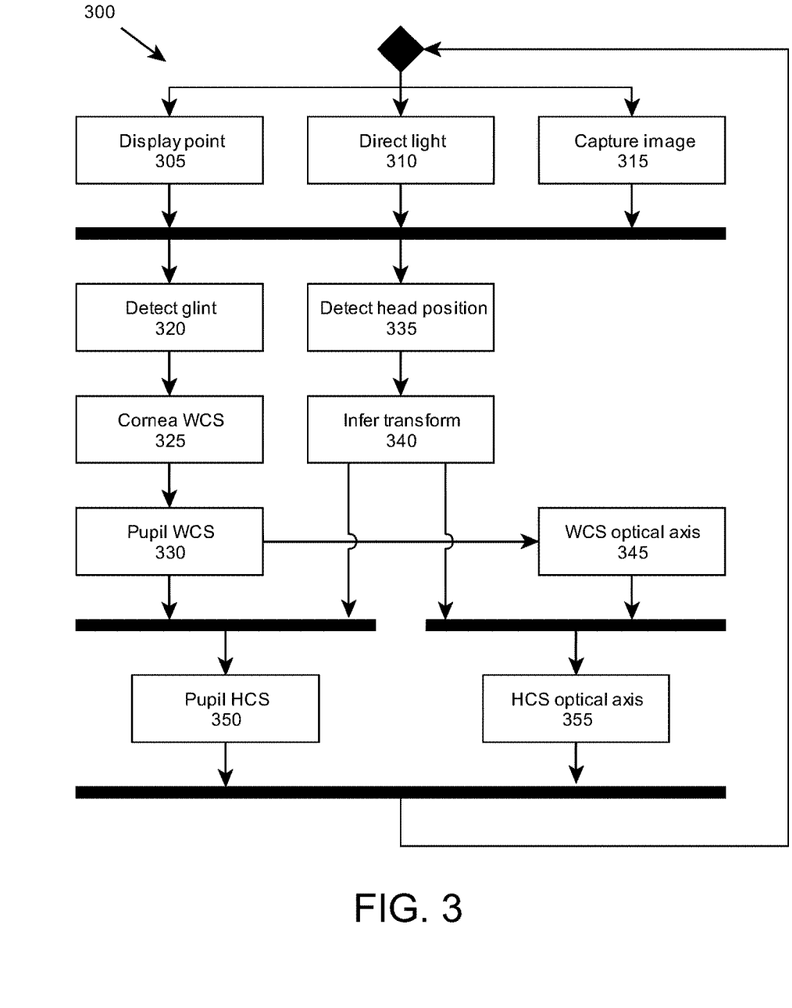
FIG. 3 is a flowchart of a submethod of FIG. 2.

Submethod 300 will be described in more detail below. During submethod 300, a number of calibration points are shown to the user, and measurements and computations are made for each point. The result is a number of sets of measurements. The sets include at least a set of coordinates of the pupil centre and a set of optical axes. Both sets can include coordinates and axes represented using the HCS. Each element of each set corresponds to measurements and computations made for one specific calibration point. Submethod 300 can be said to correspond to a "data collection phase".

The sets are organized, for instance ordered, such that it is possible to associate, e.g., coordinates of the pupil centre corresponding to one calibration point with the optical axis corresponding to the same calibration point. In some embodiments, the sets additionally include a set of coordinates of the cornea centres and/or a set of coordinates of the pupil centres represented using the WCS.

While the word "set" is used, it can be appreciated that a number of other mathematical and/or data structures can be used to obtain the same result and are understood to be included in the definition of the word "set" as used in the present disclosure. As an example, a number of vectors or similar structures can be used, e.g., one vector for each type of data of a size corresponding to the number of calibration points, or one vector for each calibration point of a size corresponding to the number of data collected per calibration point. As another example, a matrix or a similar structure can be used, e.g., a size of size P×D or P×M, where P is the number of calibration points and D is the number of data collected per calibration point.

Two subsequent steps 210 and 220 can include computing the parameters K and <α, β>, for instance using a set of coordinates of the cornea centres and a set of coordinates of the pupil centres represented using the same coordinate system, such as the WCS. In some embodiments, steps 210 and 220 are performed simultaneously with sequential quadratic programming algorithms, for instance using the method discussed in GUESTRIN, Elias Daniel and EIZENMAN, Moshe, op. cit., using a suitable number of calibration points, for instance five or more calibration points corresponding to five or more calibration point cycles. It is appreciated that other methods of computing these parameters are possible.

Steps 230 and 240 include computing parameters $k_d$ and d using a set of coordinates of pupil centres and a set of optical axes represented using the same coordinate system, such as the HCS, and including measurements and calculations corresponding to a suitable number of calibration points, for instance two or calibration points corresponding to two or more calibration point cycles. As a result of the centre of eye rotation being stationary in the HCS, when the user gazes sequentially at two or more calibration points, it is possible to find the intersection of the optical axes corresponding to two or more calibration points. This intersection point would be the centre of eye rotation. Because of noise, it is not possible to guarantee that all the optical axes from different calibration points will intersect with each other. As a result, the value of parameter $k_d$, which is a function of the centre of eye rotation, can be determined by finding points on the optical axis for which the distance between the vectors is minimized. Given two calibration points i and j, $k_d$ can be defined as:

$$\min_{k_d} \|d_i(k_d) - d_j(k_d)\|$$

where $d_i(k_d)$ and $d_k(k_d)$ are centre of eye rotations corresponding to the two different calibration points. Using the pupil centre p, the optical axis w and the constraint d=p+ $k_d$*ω discussed above, it is possible to find the closed form solution, resulting in a value of $k_d$ and d for every pair of calibration points, which can then be aggregated, for instance by calculating their mean. In some embodiments, post-processing steps are applied to eliminate noisy estimates before the aggregation.

Steps 210 to 240 can be said to correspond to an "optimization phase". In some embodiments, a validation phase can follow, wherein submethod 300 is applied again to measure the accuracy of the parameters obtained during steps 210 to 240.

With reference to FIG. 3, a submethod 300 for displaying calibration points and obtaining sets of measurements is shown in accordance with an example embodiment. Broadly described, submethod 300 includes sequentially displaying calibration points on a monitor for a user to gaze at 305, capturing at least one image of the user's face 315 while directing at least one light source towards the user's eye 310, then performing a number of measurements and computations from the image(s) 320 to 355. The entire process 305 to 355 is repeated for each calibration point. In some embodiments, two calibration points are used to obtain the data required to obtain at least the parameters $k_d$ and d. In some embodiments, more than two calibration points, e.g., nine or any other suitable number, are used to obtain more accurate parameter values and/or to obtain other parameters, such as parameters K and/or <α, β>.

In step 305, a calibration point is shown on a monitor at a known position. In some embodiments, the position of a calibration point is selected randomly. In some embodiments, the positions of a plurality of calibration points are selected such that they are substantially evenly distributed on the monitor. The point can have any suitable shape and size. In some embodiments, the point is initially displayed as moving on the monitor before stopping at the determined position for a period of time long enough to allow the user to focus their gaze on the point and to allow capturing one or more images of the user's face. In some embodiments, the size of the point changes. As an example, the size of the point can diminish so as to encourage the user to gaze at the centre of the point.

In step 310, one or more light sources are used to direct one or more light beams towards the eye of the user in order to obtain a corneal reflection of the light beams, also named glint. Step 310 can be performed at substantially the same time as step 305, or over a period of time included in or overlapping the period of step 305, or continually throughout the performance of submethod 300.

In step 315, one or more images of the user's face are acquired through an imaging sensor including one or more cameras. Each image includes at least the eye of the user. In some embodiments, each image includes sufficient features of the user face as to allow determining the position and the orientation of the user's head at the time the image is acquired. Step 315 is performed while steps 305 and 310 are being performed, such that the images include the eye of the user gazing at the calibration point while one or more beams of light are being reflected by their cornea. In some embodiments, steps 310 and 315 can be synchronized such that the light source(s) substantially function(s) as an electronic flash unit for the imaging sensor. Subsequent steps 320 to 355 can be performed for each acquired image.

In some embodiments, a region corresponding to the eye of the user is extracted from the image such that steps 320 to 330 need only be performed in the extracted region to reduce the usage of computational resources.

In step 320, each corneal reflection is detected in the image using any suitable means known in the art and its bidimensional coordinates are obtained and stored.

In step 325, the WCS coordinates of the cornea centre are computed using the bidimensional coordinates of the corneal reflections obtained in step 320, positional information between the eye and the camera (when using one light source only) and the known WCS coordinates of the light source(s) and of the imaging sensor. In some embodiments, the coordinates of the imaging sensor including a camera are the coordinates of the nodal point of the camera.

In step 330, the pupil centre is detected in the image and its bidimensional coordinates are obtained and used, along with the WCS coordinates of the cornea centre and calibration parameter K to compute the WCS coordinates of the pupil centre.

In step 335, an estimation of the pose of the user's head, including for instance the position, the orientation and/or the scale of the user's head, is obtained from any suitable method. In some embodiments, the head pose estimation is detected from the image. As an example, a landmark-based method of determining the pose of a head in an image can be used. This method can include detecting a suitable number, e.g., 468, of landmarks of the faces that are relevant to estimating its pose, including for instance features related to the eyes, the nose, the mouth and the outline of the face. Then, a tridimensional face model, for instance a generic tridimensional face model, can be used to match each landmark, thereby obtaining tridimensional coordinates for the landmark. Once this process is completed, it is possible to compute the geometric transformation that must be applied to fit the detected tridimensional landmarks onto the tridimensional face model. The geometric transformation corresponds to the head pose.

In step 340, the head pose detected in step 335 is used to infer a geometric transformation that can be used to map WCS coordinates onto HCS coordinates and/or HCS coordinates onto WCS coordinates.

In step 345, the WCS coordinates of the optical axis are determined. The optical axis is the imaginary line intersecting both the cornea and the pupil centres.

In step 350, the transformation inferred in step 340 is applied to the WCS pupil centre coordinates computed in step 330 to obtain the HCS coordinates of the pupil centre.

In step 355, the transformation inferred in step 340 is applied to the WCS optical axis computed in step 345 to obtain the HCS optical axis.

Once steps 350 and 355 are completed, if more calibration points are required or desired, submethod 300 is performed once more. In some embodiments, steps 305 to 315 can be performed a number of times, with the calibration point positions and corresponding images being saved for subsequent performance of steps 320 to 355. In some embodiments, the calibration point positions and corresponding images can be transmitted to a distant system, for instance using a network link, such that steps 305 to 315 and steps 320 to 355 can be performed in different locations and/or systems. When more than one image corresponds to one calibration point, the measured or computed data can be aggregated after any one of steps 320 to 355, for instance using the means. This can make it possible to obtain more reliable results in subsequent steps. In some embodiments, outlier values can be removed prior to aggregation.

Figure 4:
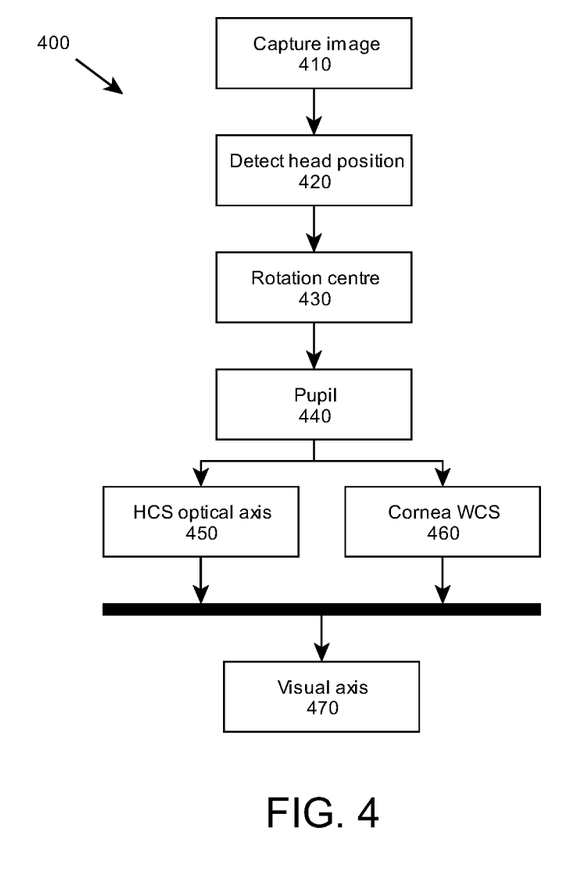
FIG. 4 is a flowchart of a method for tracking the gaze of a user, in accordance with an embodiment.

With reference to FIG. 4, a method 400 for tracking a gaze tracker for a user is shown according to an example embodiment. Broadly described, method 400 includes acquiring one or more images of the user's face 410 then performing a number of measurements and computations from the image(s) 420 to 460 in order to finally obtain the visual axis 470, which corresponds to the gaze direction. Method 400 can use the user-specific parameters obtained, for instance, through the performance of method 200.

In step 410, one or more images of the user's face are acquired through an imaging sensor including one or more cameras. This step can be performed substantially as step 315. An important difference with respect to step 315, though, is that it is not necessary that one or more light sources be directing one or more light beams towards the user's eye for method 400 to work.

In step 420, the pose of the user's head, including for instance the position, the orientation and/or the scale of the user's head, is detected from the image using any suitable means known in the art. This step can be performed substantially as step 335.

In step 430, the WCS coordinates of the centre of the user's eye rotation are computed, e.g., by applying a transformation inferred from the head pose detected in step 420 and the parameter d.

In step 440, the pupil centre is detected in the image using any suitable means known in the art and its bidimensional coordinates are obtained and used, along with the WCS coordinates of the centre of the user's eye rotation and a parameter $k_d$ to compute the WCS coordinates of the pupil centre. This can be done for instance by solving $\|p-d\|=k_d$, where d is the coordinates of the eye centre and p is the coordinates of the pupil centre.

In some embodiments, a region corresponding to the eye of the user is extracted from the image such that step 440 need only be performed in the extracted region to reduce the usage of computational resources.

In step 450, the WCS coordinates optical axis are determined using the WCS coordinates of the centre of the user's eye and of the centre of the user's pupil in the world coordinate system, and parameter $k_d$. This can be done, for instance, by solving $d=p+k_d\,\omega$, where d is the coordinates of the eye centre, p is the coordinates of the pupil centre, and ω is the coordinates of the optical axis.

In step 460, the WCS coordinates of the user's cornea centre are determined using the WCS coordinates of the centre of the user's pupil and of the optical axis, and parameter K.

Finally, in step 470, the visual axis is determined from the WCS coordinates of the centre of the user's cornea and the optical axis, and from parameter <α, β>. The visual axis corresponds to the gaze direction.

In some embodiments, the images can be transmitted to a distant system, for instance using a network link, such that step 410 and steps 420 to 470 can be performed in different locations and/or systems. When more than one image corresponds to one calibration point, the measured or computed data can be aggregated after any one of steps 420 to 470, for instance by calculating their mean. This can make it possible to obtain more reliable results in subsequent steps. In some embodiments, outlier values can be removed prior to aggregation.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A method for tracking a gaze of a user, the method comprising:
   obtaining, by an imaging sensor, at least one image of the user's face;
   obtaining a head pose estimation corresponding to the at least one image;
   computing a centre of the user's eye rotation in a world coordinate system from the head pose estimation and a parameter d corresponding to coordinates of the centre of the user's eye in a head coordinate system;
   computing coordinates of the centre of the user's pupil in the world coordinate system from the centre of the user's eye in the world coordinate system and a parameter $k_d$ corresponding to a distance between the centre of the user's eye and the centre of the user's pupil;
   computing an optical axis in the world coordinate system from the centre of the user's eye and the centre of the user's pupil in the world coordinate system, and the parameter $k_d$;
   computing a centre of the user's cornea in the world coordinate system from the centre of the user's pupil and the optical axis in the world coordinate system, and a parameter K corresponding to a distance between the centre of the user's cornea centre and the centre of the user's pupil; and
   computing a visual axis from the centre of the user's cornea and the optical axis in the world coordinate system, and from a parameter $\langle \alpha, \beta \rangle$ corresponding to an angle between the optical axis and the visual axis, the visual axis corresponding to a gaze direction.

2. The method of claim 1, wherein the imaging sensor comprises at least one of a colour camera and an infrared camera.

3. The method of claim 1, wherein obtaining the head pose estimation comprises:
   detecting a plurality of bidimensional face landmarks from each of the at least one image;
   fitting the user's face to a tridimensional face model based on the bidimensional face landmarks; and
   detecting the head pose corresponding to the image based on the model-fitted user's face.

4. The method of claim 1, wherein computing the coordinates of the centre of the user's pupil p from the parameter d and the parameter $k_d$ comprises solving $\|p-d\|=k_d$.

5. The method of claim 1, wherein computing the optical axis ω from the parameter d, the centre of the user's pupil p and the parameter $k_d$ comprises solving $d=p+k_d \omega$.

6. A method for calibrating a gaze tracker for a user, the method comprising:
   performing at least two calibration point cycles, wherein performing each calibration point cycle comprises:
      displaying a calibration point on a monitor for the user to gaze at,
      directing, by at least one light source, at least one beam of light towards the user's eye to obtain a corneal reflection,
      obtaining, by an imaging sensor, at least one image of the user's face,
      obtaining a head pose estimation corresponding to the at least one image,
      detecting the corneal reflection from a region of the image comprising the user's eye,
      computing coordinates of a cornea centre in a world coordinate system using coordinates of the corneal reflection, the light source and the imaging sensor in the world coordinate system,
      computing coordinates of a pupil centre in the world coordinate system using the coordinates of the corneal reflection,
      obtaining an optical axis in the world coordinate system, wherein the optical axis in the world coordinate system corresponds to the axis intersecting the cornea centre and the pupil centre,
      inferring, from the head pose estimation, a transformation that, when applied to coordinates in the world coordinate system, yields corresponding coordinates in a head coordinate system,
      applying the transformation to the coordinates of the pupil centre in the world coordinate system to obtain corresponding coordinates of the pupil centre in the head coordinate system, and
      applying the transformation to the optical axis in the world coordinate system to obtain a corresponding optical axis in the head coordinate system; and
   computing, from the coordinates of the pupil centre and the optical axis in the head coordinate system:
      a parameter $k_d$ corresponding to a distance between a centre of the user's eye and the pupil centre, and
      a parameter d corresponding to coordinates of the centre of the user's eye in the head coordinate system.

7. The method of claim 6, wherein exactly two calibration point cycles are performed.

8. The method of claim 6, wherein the at least two calibration point cycles correspond to at least five calibration point cycles and are performed to further obtain:
   coordinates of the cornea centre in the world coordinate system; and
   coordinates of the pupil centre in the world coordinate system,
   further comprising computing, from the coordinates of the cornea centre and of the pupil centre in the world coordinate system:
      a parameter K corresponding to a distance between the cornea centre and the pupil centre; and
      a parameter $\langle \alpha, \beta \rangle$ corresponding to an angle between the optical axis and a visual axis.

9. The method of claim 6, wherein the light source comprises at least one of an infrared light-emitting diode, a colour light-emitting diode, the monitor, an ambient lighting device and a natural light source, and wherein the imaging sensor comprises at least one of an infrared camera and a colour camera.

10. The method of claim 6, wherein computing the parameter $k_d$ comprises minimizing $\|d_i(k_d)-d_j(k_d)\|$ for all pairs of the calibration point cycles corresponding to first eye centre coordinates $d_i$ and second eye centre coordinates $d_j$ estimated from the pupil centre p and the optical axis ω with $d=p+k_d \omega$.

11. A gaze tracking system comprising:
   an imaging sensor for obtaining at least one image of a user's face;
   at least one memory storing a set of parameters associated with the user; and
   a gaze estimation module configured to:
      detect a head pose corresponding to the image,
      compute a centre of the user's eye rotation in a world coordinate system from the head pose and a parameter d corresponding to coordinates of the centre of the user's eye in a head coordinate system, compute coordinates of a centre of the user's pupil in a world coordinate system from the centre of the user's eye in the world coordinate system and a parameter $k_d$ corresponding to a distance between the centre of the user's eye and the centre of the user's pupil, compute an optical axis in the world coordinate system from the centre of the user's eye and the centre of the user's pupil in the world coordinate system, and the first parameter $k_d$, compute the centre of the user's cornea in the world coordinate system from the centre of the user's pupil and the optical axis in the world coordinate, and a parameter K corresponding to a distance between the centre of the user's cornea and the centre of the user's pupil, and compute a visual axis from the centre of the user's cornea and the optical axis in the world coordinate system, and from a parameter <α, β> corresponding to an angle between the optical axis and the visual axis, a visual axis corresponding to a gaze direction.

12. The gaze tracking system of claim 11, wherein the gaze estimation module is configured to detect the head pose by performing the steps of:

detecting a plurality of bidimensional face landmarks from the image;

fitting the user's face to a tridimensional face model based on the bidimensional face landmarks; and detecting the head pose corresponding to the image based on the model-fitted user's face.

13. The gaze tracking system of claim 11, wherein the imaging sensor comprises at least one of a colour camera and an infrared camera.

14. The gaze tracking system of claim 11, wherein the gaze estimation module is configured to compute the coordinates of the centre of the user's pupil p from the centre of the user's eye d and the first parameter $k_d$ by solving $\|p-d\|=k_d$.

15. The gaze tracking system of claim 11, wherein the gaze estimation module is configured to compute the optical axis ω from the centre of the user's eye d, the centre of the user's pupil p and the first parameter $k_d$ by solving $d=p+k_d\omega$.

16. The gaze tracking system of claim 11, further comprising:

at least one light source;

a monitor; and a calibration module configured to:

perform at least two calibration point cycles, wherein performing each calibration point cycle comprises the steps of:

displaying a calibration point on the monitor for the user to gaze at, directing, by the at least one light source, at least one beam of light towards the user's eye to obtain a corneal reflection, obtaining, by the imaging sensor, at least one calibration image of the user's face, detecting a calibration head pose from the at least one calibration image, detecting the corneal reflection from a region of the calibration image comprising the user's eye, computing calibration coordinates of the cornea centre of the user's cornea in the world coordinate system using coordinates of the corneal reflection, the light source and the imaging sensor in the world coordinate system, computing the calibration coordinates of the centre of the user's pupil in the world coordinate system using the calibration coordinates of the corneal reflection, obtaining a calibration optical axis in the world coordinate system, wherein the calibration optical axis in the world coordinate system corresponds to the axis intersecting a calibration cornea centre and a calibration pupil centre, inferring, from the calibration head pose, a calibration transformation that, when applied to calibration coordinates in the world coordinate system, yields corresponding calibration coordinates in the head coordinate system, applying the calibration transformation to the calibration coordinates of the centre of the user's pupil in the world coordinate system to obtain corresponding calibration coordinates of the centre of the user's pupil in the head coordinate system, and applying the calibration transformation to the calibration optical axis in the world coordinate system to obtain a corresponding calibration optical axis in the head coordinate system; and compute, from the coordinates of the centre of the user's pupil and an optical axis in the head coordinate system:

the parameter $k_d$, and the parameter d.

17. The gaze tracking system of claim 16, wherein the at least two calibration point cycles correspond to at least five calibration point cycles and the calibration module performs the at least five calibration point cycles to further obtain:

coordinates of the centre of the user's cornea in the world coordinate system; and coordinates of the centre of the user's pupil in the world coordinate system, and is further configured to compute, from the coordinates of the centre of the user's cornea and of the centre of the user's pupil in the world coordinate system:

a parameter K; and a parameter ⟨α, β⟩.

18. The gaze tracking system of claim 16, wherein the light source comprises at least one of an infrared light-emitting diode, a colour light-emitting diode, the monitor, an ambient lighting device and a natural light source.

19. The gaze tracking system of claim 16, wherein the light source comprises an infrared light-emitting diode, and wherein the imaging sensor comprises at least an infrared camera and a colour camera, wherein the infrared light-emitting diode and the infrared camera are only used by the calibration module.

20. The gaze tracking system of claim 16, wherein computing the parameter $k_d$ comprises minimizing $\|d_i(k_d)-d_j(k_d)\|$ for all pairs of the calibration point cycles corresponding to first eye centre coordinates $d_i$ and second eye centre coordinates $d_j$ estimated from the distance between the centre of the user's cornea and the centre of the user's pupil p and the optical axis ω with $d=p+k_d\omega$.

* * * * *